INVENTOR
CHARLES L. KENNEDY
BY Henry H Snelling
ATTORNEY

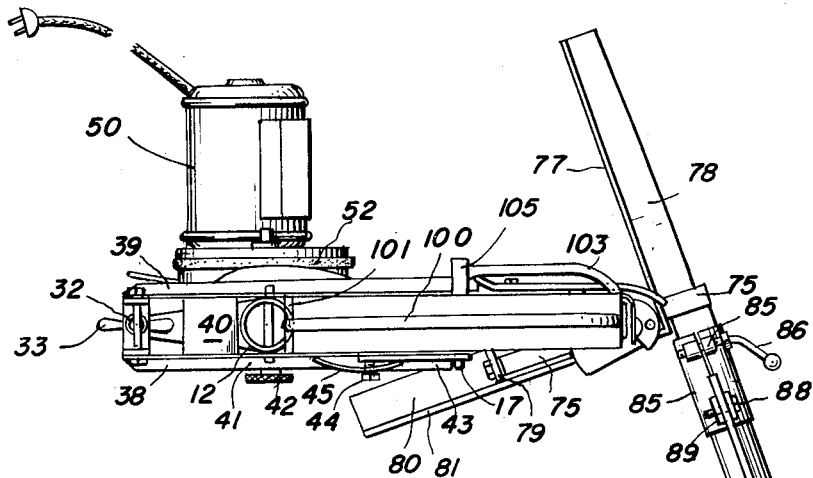
FIG. 2
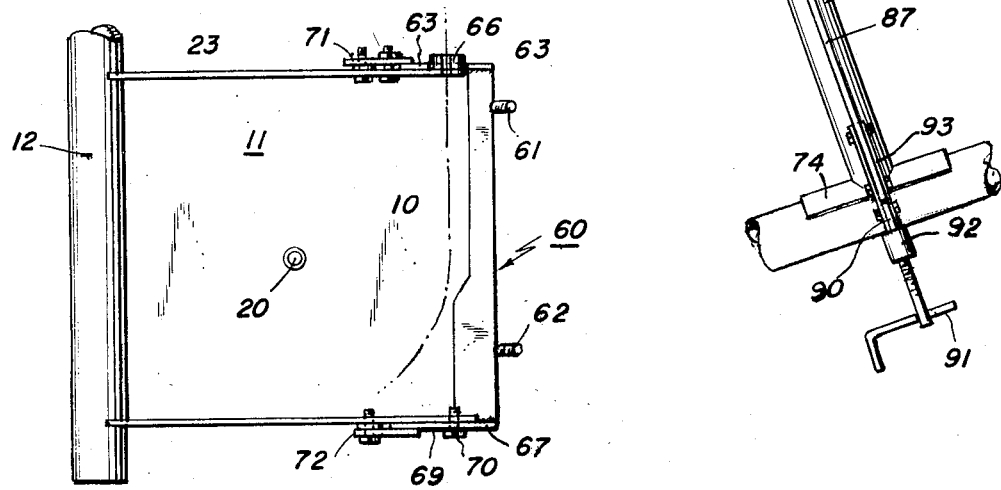
FIG. 4
FIG. 5
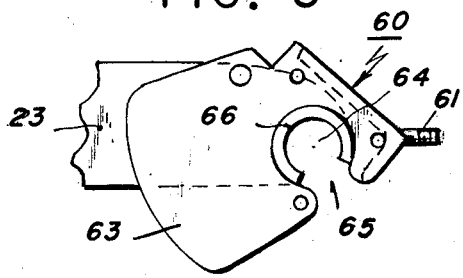
INVENTOR
CHARLES L. KENNEDY
BY Henry H Snelling
ATTORNEY Sept 17, 1957 C. L. KENNEDY 2,806,490
PORTABLE CUT-OFF BAND SAW
Filed Dec. 31, 1954 3 Sheets-Sheet 3

INVENTOR
CHARLES L. KENNEDY
BY Henry H. Snelling
ATTORNEY

2,806,490
PORTABLE CUT-OFF BAND SAW

Charles L. Kennedy, Columbia, S. C.

Application December 31, 1954, Serial No. 479,127

7 Claims. (Cl. 143—17)

This invention relates to band saws and has for its principal object the provision of an easily portable cut-off saw particularly adapted to cutting off lengths of metal bars, tubes, angles and other pieces which are too long to be handled in ordinary band saws.

A further object of the invention is to provide an exceptionally rugged cut-off band saw of simple design which while highly versatile and easy to operate can be made at a competitive price without sacrifice of high efficiency.

A further object of the invention is to provide for the cutting off of sections from a heavy piece of work resting upon the floor, this being accomplished by pivoting the bottom of the hinge post or stile of the swinging saw assembly to a stand clamped to the work on or near the floor so that the band saw blade is movable about a horizontal axis generally parallel to the work, for example a rod, angle iron, channel, or similar elongated piece. The band saw assembly may be clamped at any chosen angle with respect to the stile and while so angled, frequently at 45°, may be brought into contact with the work by moving the saw assembly together with a portion of the stand about such horizontal axis, allowing the blade to feed into the work by gravity as controlled by the operator.

A further object of the invention is to provide simple quickly operated means for replacing the band saw blade and for tensioning the blade quickly and accurately without the need for a tool of any kind, the design eliminating the need for the usual coil springs while permitting the use of readily available light weight parts.

In the drawings:

Figure 2 is a plan view;

Figure 4 (Sheet 2) is a detail.

Figure 5 is a top plan view of the top of the stile.

Figure 1:
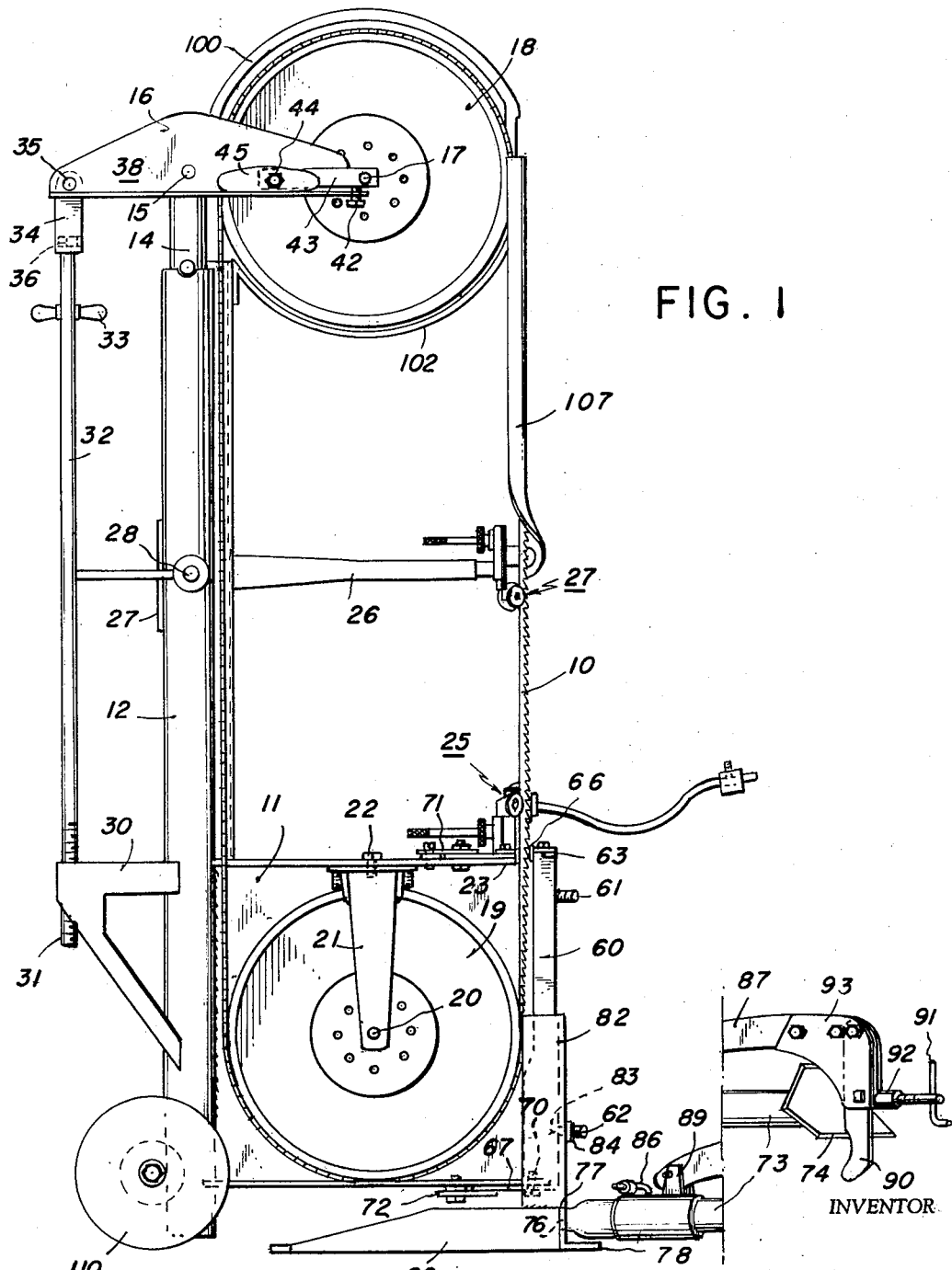
Figure 1 is a side elevation of the saw mounted on its stand.

The main support of the saw assembly which carries the metal cutting band saw blade 10 includes a vertical plate 11, welded at one side to the column 12 having an adjustable extension 14 pivotally carrying as at 15 a lever bracket 16 at the end of which is supported shaft 17 of the upper saw wheel 18.

The lower saw wheel 19 is carried by shaft 20 projecting through plate 11 and which has an outer bearing at the lower end of a pedestal 21 secured as at 22 to the angle 23, fast to plate 11. This angle iron top of the plate also carries the lower saw guide assembly denoted as a whole by the numeral 25. A saw guide arm 26 has a semi-circular flange 27 which embraces the column 12. The arm 26 which carries the upper saw guide denoted as a whole by the numeral 27, is raised or lowered on the column as desired and is locked in desired elevation by the adjusting screw 28.

A bracket 30 fast to the column is tapped to receive the lower threaded end 31 of the adjusting rod 32 which near its upper end carries a pair of handles 33 somewhat elongated to give the necessary leverage and by means of which the rod may be rotated and hence axially moved by its threaded engagement with the bracket, this movement being permitted as the rod 33 turns freely in yoke 34 pivoted at 35 to the outer free end of the transfer lever 16. The head or pinned collar 36 of the rod 32 engages the center of the yoke and causes the wheel carrying end of the transfer arm to move upwardly about its pivot 15 as the adjusting rod is turned farther into bracket 30 thus raising the shaft 17 which carries the upper saw wheel 18. The weight of the saw wheel 18 constantly keeps rod 32 in tension hence reverse movement of the handles 33 lowers the upper band wheel and the tension on the band saw blade.

The lever bracket 16 consists of two parallel arms 38 and 39, the latter being somewhat longer and furnishing a bearing for shaft 17. The two arms are connected together in any suitable manner as, for example, by the steel tubing 40 (Fig. 2). Each of the two plates has an outwardly extending flange 41 through one of which a screw 42 engages the bottom edge of a shaft supporting extension 43 of plate 38, this extension being loosely pivoted about a bolt 44 carried by plate 38, which bolt also supports a curved spring 45 one end of which rests against the side of plate 38 and the other end of which engages extension 43 about midway between its loose support 44 and the bearing for shaft 17. The strength of the spring 45 is such as to retain the proximate end of the shaft 17 in its bearing in extension 43 and yet readily to yield when the free end of extension 43 is pulled away from the shaft 17 to free the latter from the extension as, for example, in removing the band saw blade 10.

Figure 3:
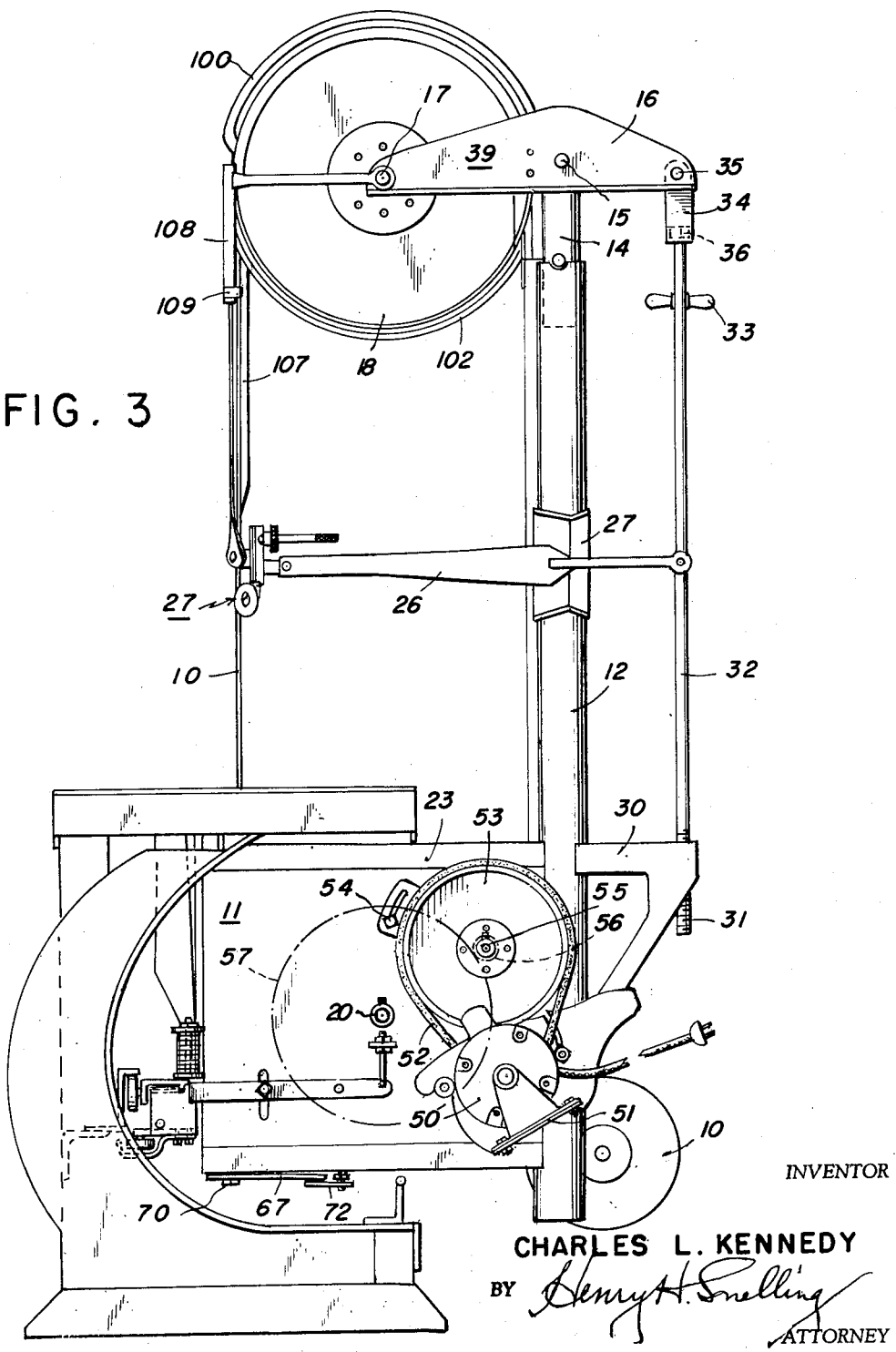
Figure 3 is a side elevation showing the opposite side of the saw assembly from Fig. 1.

Referring now to Figure 3: motor 50, which may be of quarter-horsepower size, is mounted on bracket 51 pivoted to the plate 11 and through V-belt 52 drives driven wheel 53 pivoted to plate 11 slightly offset from the shaft axis and adjustable on the plate as at 54. The drive is through a stepped cone pulley (not shown) on the armature shaft of the motor so that by shifting the V-belt the saw may be driven at the desired speed. The shaft 55 of the driven wheel 53 carries a pinion 56 meshing with an internal gear 57 on the inside flange of the lower driven band saw wheel 19, this wheel having rotation only, the tensioning of the band saw blade being controlled by movement of the upper band wheel. This adjustment of the driven wheel permits easy control of the meshing of the gears as the pinion gear can be moved with relation to the internal gear as the center of the movement of the support is spaced from the axis of shaft 55.

Stile 60, to which the saw assembly is hinged carries two screws 61 and 62 which are welded to the vertex of the stile (Fig. 5) for quick but secure attachment selectively to a traveling or a relatively stationary support. At the top of the vertical angle iron of stile 60 is welded a plate 63 of irregular shape having a circular recess 64 with an opening 65 in which turns trunnion 66 rising from the flanged top 23 of plate 11. At its bottom the stile 60 carries a welded plate 67, the free arcuate edge 68 of which has a center at the removable pivot pin 70 coaxial with the center of recess 64 so that the saw assembly may hinge about an axis in line with the cutting edge of saw blade 10 as it engages the work. Consequently the saw assembly hinges freely in the two plates carried by the stile and the saw assembly may therefore turn freely about an axis in alignment with the cutting edge of the band saw blade. This axis is vertical when the stile 60 is upright as it would be when the assembly is mounted on a reciprocating carriage in a table or frame. Clamps 71 and 72 when tightened hold the saw assembly at a chosen angle to the stile 60.

When used as a cut-off saw, the saw assembly is mounted on a stand, a simple form of which is shown in the drawings. Tubular member 73 carries at one end the angular jaw or work seating member 74 and at its other end carries a pivoting hinge rod or pipe 75 (Fig. 2). This pivot rod passes through a bearing hole 76 in flange 77 of angle iron 78 which may be considered as an extension of tube 73 as both rest upon the ground or upon a table top or other platform. The other end of pipe 75 is pivoted to a bracket 79 welded to angle iron 80, the vertex 81 of which pivots on the ground or other supporting surface on which the band saw rests as the saw is moved to the work. An upright member 82 is welded to vise stand member 80 and has a hole 83 in its vertex to receive the threaded stud 62, permanently carried by stile 60. The upright 82 and the stile 60 are secured together by the nut 84. Any other means for detachably securing the upright to the hinge post or stile may be used.

On the tube 73 is mounted a sleeve 85 (Fig. 2) which carries means such as 86 for locking the sleeve to the tube. An arm 87, pivoted as at 88 in lugs 89 on the sleeve, pivotally carries a clamp link or jaw 90 which engages the work when moved by handle 91 threaded in a sleeve 92 secured to the body 93.

The curved pipe handle 100 at its rear end carries a T 101, (Fig. 2), secured to both of the arms 38 and 39, and at front is secured to the circular saw guard 102 which, in turn, is supported by arm 103 fast to a sleeve 105 on shaft 17. The angular vertical saw blade guard 107 is readily removable from its support 108 (Fig. 3), being snapped into position past a spring lock 109. This guard member 107 must be removed before replacing the band saw blade as one of its two flanges is in front of the teeth of the saw blade.

In using the band saw as a cut-off saw the tubular member 73 is moved until its angle iron jaw 74 is in contact with the work. The pivoted clamping member 90 is now fastened by means of the handle 91 so that the work is firmly held in the main member of the stand. The saw assembly, which is moved from place to place by the simple ground wheel 110, carried by the bottom of the column, is positioned so that the threaded stud 62 of the stile or hinge post 60 extends through the upright member 82 of the stand. The assembly when thus bolted to the stand is turned about its vertical pivot on the stile to the desired angle, usually 45° and then locked in place by fastening the clamps 71 and 72. The upper and lower saw guides 27 and 25 having been properly adjusted in the usual manner, the operator grasps the handle 100 and lowers the saw blade into contact with the work, the length of the main tubular member of the stand being such as to bring the blade in contact with the work between the upper and lower saw guides. Obviously, the work may be shifted with respect to the stand to cut off the second piece or the stand may be moved with respect to the work should that be simpler.

It is quite simple to tighten the band saw blade. All that is required is to turn the rod 32 until the desired tension is secured. The lower band wheel is of course stationary and movement of the handles 33 through the yoke 34 rocks the lever bracket 16 about its pivot 15 elevating or lowering the upper band wheel and its shaft 17. This design permits the use of light weight parts and avoids coil springs which frequently cause trouble.

The band saw blade can readily be replaced without difficulty and without the necessity for using tools, this being true even when the saw assembly is secured by its stile 60 to a table. All that is necessary is to loosen sufficiently the adjusting rod 32 which lowers the upper band wheel to such a degree as to free the band saw blade from the lower band wheel and let the blade pass to the hub of the upper band wheel in the clearance space between this wheel and the pivoted lever bracket. The outer end of extension 43 is now pulled forward to the observer as in Fig. 1, compressing the plate spring 45 and freeing the near end of shaft 17. The blade is now slipped off the near end of the shaft and is free. The extension snaps back into position to retain the shaft as soon as it is released. To install a new band saw blade the foregoing procedure is simply reversed.

What I claim is:

1. In a cut-off saw for sawing a heavy elongated work piece too heavy to raise conveniently to a table and therefore resting on the floor, the combination with a saw frame carrying a band saw blade, its band wheels, its saw guides, and a motor for driving the blade, of a normally vertical stile to which the frame is hinged for swinging movement about an axis parallel to the stile, means for clamping the frame to the stile in chosen position, and supporting means on which the stile is hinged for movement about a horizontal axis proximate the floor on which the supporting means rests, said supporting means being adapted to rest on the floor and having means to clamp it to the elongated work piece.

2. The combination of claim 1 in which a clamp locks the frame to the stile at an acute angle whereby the frame may be lowered about the horizontal pivot and will bring the saw blade into contact with the work piece without regard to the length of the work piece extending on either side of the clamping means.

3. The combination of claim 2 in which the supporting means includes a two member base, one member of which carries the last named clamping means near one end and carries a hinging rod, said rod being connected to the other member to form a pivot about which the frame and the stile turn about said horizontal axis from a generally vertical position to a generally horizontal position.

4. The combination of claim 3 in which said other member is an angle iron rocking on its vertex parallel to and closely proximate the hinging rod and the last named clamping means includes a sleeve sliding upon said one member and cooperating with a work receiving jaw at the end of the one member.

5. A portable cut-off band saw machine comprising a vertically disposed plate, an elongated vertical cylindrical column secured to one side edge thereof, a motor on the plate, a lower band wheel pivoted to the plate and driven by the motor, an arm extending horizontally from the column generally parallel to said plate, an upper band wheel rotatably carried by the arm, a band saw blade running on said band wheels, and a vertical stile, means for hinging the band saw machine to the stile to move about an axis parallel to the stile and a ground engaging base detachably secured to the stile, said base having a horizontal pivot proximate the ground about which pivot the stile and consequently the saw machine may turn to bring a portion of the band saw blade parallel to the ground.

6. In a cut-off saw for sawing work pieces too long to handle in an ordinary band saw and which therefore are sawed while resting on the floor, a saw assembly including a frame having a normally upright member at the bottom thereof and a handle at the top thereof, a plurality of band wheels mounted on said frame, and a band saw blade on said wheels; an elongated member to rest on the floor and having at one end work clamping mechanism and having well spaced from the clamping mechanism an elongated horizontal pivot extending at an angle of 90° and parallel to the floor, a stand to turn about said pivot, said stand having a horizontal arm to rest on the floor and a vertical arm to receive the saw assembly, and means for detachably securing together the normally upright frame member and the vertical arm of the stand in parallel relation so that when the saw assembly is secured to the stand the saw assembly and the stand may be turned as a unit about said pivot by the operator moving the saw frame handle to bring the cutting portion of the band saw blade into contact with the work resting on the floor and held by the clamping mechanism.

7. The machine of claim 6 with a floor engaging angle iron secured to and forming an extension of the elongated member and in which the horizontal arm of the stand is also an angle iron whereby the two angle irons standing at right angles to each other, each with a flange resting on the floor, will afford support to the saw assembly before the work is clamped to the elongated member.

References Cited in the file of this patent

UNITED STATES PATENTS

| | | |
|---|---|---|
| 31,768 | Sullenberger | Mar. 19, 1861 |
| 332,365 | Stephens | Dec. 15, 1885 |
| 919,128 | Cleveland | Apr. 20, 1909 |
| 950,638 | Nolan et al. | Mar. 1, 1910 |
| 1,427,661 | Walker | Aug. 29, 1922 |
| 1,576,051 | Jull | Mar. 9, 1926 |
| 1,580,407 | Carlson | Apr. 13, 1926 |
| 2,307,190 | Bell | Jan. 5, 1943 |
| 2,555,056 | Pence | May 29, 1951 |
| 2,594,548 | Flick | Apr. 29, 1952 |
| 2,627,881 | Houtte et al. | Feb. 10, 1953 |
| 2,695,637 | Ocenasek | Nov. 30, 1954 |
| 2,700,402 | Walden | Jan. 25, 1955 |
| 2,711,195 | Hill | June 21, 1955 |
| 2,705,510 | Stocke | Apr. 5, 1955 |

FOREIGN PATENTS

| | | |
|---|---|---|
| 1,923 | Great Britain | 1858 |
| 425,154 | France | Mar. 29, 1911 |